(12) United States Patent
Kaneko et al.

(10) Patent No.: US 12,026,358 B2
(45) Date of Patent: Jul. 2, 2024

(54) INFORMATION PROCESSING APPARATUS, INFORMATION PROCESSING METHOD, AND INFORMATION PROCESSING PROGRAM

(71) Applicant: FUJIFILM CORPORATION, Tokyo (JP)

(72) Inventors: Yasuhisa Kaneko, Kanagawa (JP); Tomohide Hiragami, Kanagawa (JP); Kenji Nagamiya, Kanagawa (JP); Yasuyuki Hosono, Kanagawa (JP); Nobuya Kitamura, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 73 days.

(21) Appl. No.: 17/929,759

(22) Filed: Sep. 6, 2022

(65) Prior Publication Data

US 2023/0096594 A1 Mar. 30, 2023

(30) Foreign Application Priority Data

Sep. 27, 2021 (JP) ................................. 2021-157273

(51) Int. Cl.
*G06F 3/0484* (2022.01)
*G06F 16/9535* (2019.01)
*G06F 16/9538* (2019.01)
*G06F 40/279* (2020.01)
*G06F 40/35* (2020.01)

(52) U.S. Cl.
CPC ........ *G06F 3/0484* (2013.01); *G06F 16/9535* (2019.01); *G06F 16/9538* (2019.01); *G06F 40/279* (2020.01); *G06F 40/35* (2020.01); *G06F 2203/04803* (2013.01)

(58) Field of Classification Search
CPC ......... G06F 3/048; G06F 3/0484–0486; G06F 2203/04803; G06F 16/9535; G06F 16/9538; G06F 40/279–295; G06F 40/35; G06F 1/1624; G16H 50/20
See application file for complete search history.

(56) References Cited

U.S. PATENT DOCUMENTS

| 9,536,049 B2 * | 1/2017 | Brown ................ G06F 3/04886 |
| 11,000,236 B2 * | 5/2021 | Zhong .................... G16H 40/63 |
| 11,367,532 B2 * | 6/2022 | Hoar ...................... G16H 20/10 |
| 2003/0229522 A1 * | 12/2003 | Thompson ............. G06Q 40/00 705/348 |

(Continued)

FOREIGN PATENT DOCUMENTS

JP 2019-535085 A 12/2019

*Primary Examiner* — Liang Y Li
(74) *Attorney, Agent, or Firm* — SOLARIS Intellectual Property Group, PLLC (57) ABSTRACT

An information processing apparatus includes at least one processor. The processor performs a process of displaying biological information of a user in a first region of a display screen, displaying a text indicating a content of a conversation between the user and a chatbot in a second region of the display screen together with the biological information displayed in the first region, and displaying a result of a web search in a third region of the display screen together with the biological information displayed in the first region and the text displayed in the second region.

9 Claims, 10 Drawing Sheets

(56) References Cited

U.S. PATENT DOCUMENTS

| | | | |
|---|---|---|---|
| 2009/0088606 A1* | 4/2009 | Cuddihy | G16H 40/67 |
| | | | 600/300 |
| 2018/0108076 A1* | 4/2018 | Tu | G06F 3/0482 |
| 2019/0261519 A1* | 8/2019 | Park | H04M 1/0268 |
| 2019/0355447 A1* | 11/2019 | Barkol | G16H 80/00 |
| 2021/0057111 A1* | 2/2021 | Barkol | H04L 51/046 |
| 2021/0225505 A1* | 7/2021 | Khare | G06F 11/3089 |
| 2021/0241905 A1 | 8/2021 | Hoar et al. | |

* cited by examiner

FIG. 11

INFORMATION PROCESSING APPARATUS, INFORMATION PROCESSING METHOD, AND INFORMATION PROCESSING PROGRAM

CROSS-REFERENCE TO RELATED APPLICATIONS

The present application claims priority under 35 U.S.C. § 119 to Japanese Patent Application No. 2021-157273, filed on Sep. 27, 2021. The above application is hereby expressly incorporated by reference, in its entirety, into the present application.

BACKGROUND

1. Technical Field

The disclosed technology relates to an information processing apparatus, an information processing method, and an information processing program.

2. Description of the Related Art

The following technologies are known as technologies of providing useful information for health management of a user. For example, JP2019-535085A discloses a system comprising a conversation engine including at least one of a prediction analysis module and a machine learning module, a database of information related to disease management, a user database of user information that is stored for at least one patient, the user information including at least one of measured patient disease management data or user data related to the disease management, and a chatbot configured to receive user input including a question started by a user.

SUMMARY

In recent years, a wearable device, such as a smart watch, has made it possible to daily measure biological information, such as a heartbeat, a blood pressure, and electrocardiography, of a user. In addition, a chatbot is also used to urge the user to manage his/her health. In addition, the user may acquire useful information for his/her health management by a web search. It is considered that the convenience of the user can be improved by integrating devices and functions related to the health management of the user as described above.

The disclosed technology is made in view of the above points, and is to improve the convenience of the user in providing the useful information for the health management of the user.

The disclosed technology relates to an information processing apparatus comprising at least one processor, in which the processor performs a process of displaying biological information of a user in a first region of a display screen, displaying a text indicating a content of a conversation between the user and a chatbot in a second region of the display screen together with the biological information displayed in the first region, and displaying a result of a web search in a third region of the display screen together with the biological information displayed in the first region and the text displayed in the second region.

The processor may perform a process of displaying a result of performing the web search based on a word input by the user in the conversation with the chatbot in the third region.

The processor may display a result of performing the web search based on the biological information in the third region.

The processor may change a disposition and a display area of each of the first to third regions in accordance with a rotation operation of the display screen.

The processor may perform a process of displaying the result of the web search displayed in the third region on an entire display screen based on an input operation.

The processor may display the result of the web search displayed in the third region together with a history of the biological information based on an input operation.

The display screen may be expandable, and in a case in which the display screen is expanded, the processor may display the result of the web search in an expanded region of the display screen.

The disclosed technology relates to an information processing method executed by at least one processor provided in an information processing apparatus, the method comprising displaying biological information of a user in a first region of a display screen, displaying a text indicating a content of a conversation between the user and a chatbot in a second region of the display screen together with the biological information displayed in the first region, and displaying a result of a web search in a third region of the display screen together with the biological information displayed in the first region and the text displayed in the second region.

The disclosed technology relates to an information processing program causing at least one processor provided in an information processing apparatus to execute a process comprising displaying biological information of a user in a first region of a display screen, displaying a text indicating a content of a conversation between the user and a chatbot in a second region of the display screen together with the biological information displayed in the first region, and displaying a result of a web search in a third region of the display screen together with the biological information displayed in the first region and the text displayed in the second region.

According to the disclosed technology, it is possible to improve the convenience of the user regarding the provision of the useful information for the health management of the user.

BRIEF DESCRIPTION OF THE DRAWINGS

Exemplary embodiments according to the technique of the present disclosure will be described in detail based on the following figures, wherein.

DETAILED DESCRIPTION

In the following, an example of an embodiment of the disclosed technology will be described with reference to the drawings. It should be noted that the same or equivalent components and portions in the drawings are represented by the same reference numerals, and the overlapping description will be omitted.

Figure 1:
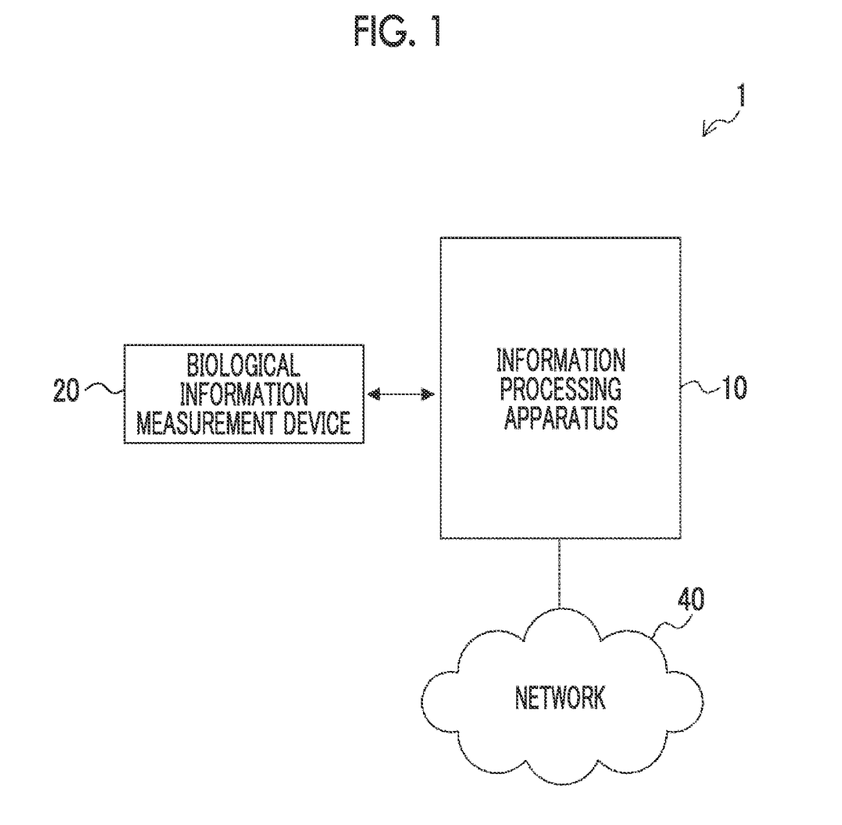
FIG. 1 is a diagram showing an example of a configuration of a health management system 1 according to an embodiment of the disclosed technology.

FIG. 1 is a diagram showing an example of a configuration of a health management system 1 according to an embodiment of the disclosed technology. The health management system 1 includes an information processing apparatus 10 and a biological information measurement device 20.

The information processing apparatus 10 is a communication terminal apparatus used by a user who is a management target subject by the health management system 1. The information processing apparatus 10 may be, for example, a desktop computer, a laptop, a tablet computer, or a smartphone. The information processing apparatus 10 is connected to a network 40 that can be used by the public, such as the Internet. The information processing apparatus 10 can access a web server (not shown) via the network 40, or can perform a web search by using a search engine.

The biological information measurement device 20 measures biological information of the user. The biological information may be, for example, information indicating at least one of a body temperature, a heartbeat, electrocardiography, myoelectricity, a blood pressure, arterial oxygen saturation (SpO2), a blood glucose level, or a lipid level. The biological information measurement device 20 may be a wearable device, such as a smart watch, comprising a sensor that measures these pieces of the biological information. The biological information measurement device 20 has a function of continuously measuring the biological information of the user in accordance with a predetermined time schedule and storing the biological information in an internal memory. The biological information measurement device 20 may measure the biological information for each predetermined period (for example, at intervals of 30 minutes). The biological information measurement device 20 is communicably connected to the information processing apparatus 10, and transmits the measured biological information to the information processing apparatus 10.

Figure 2:
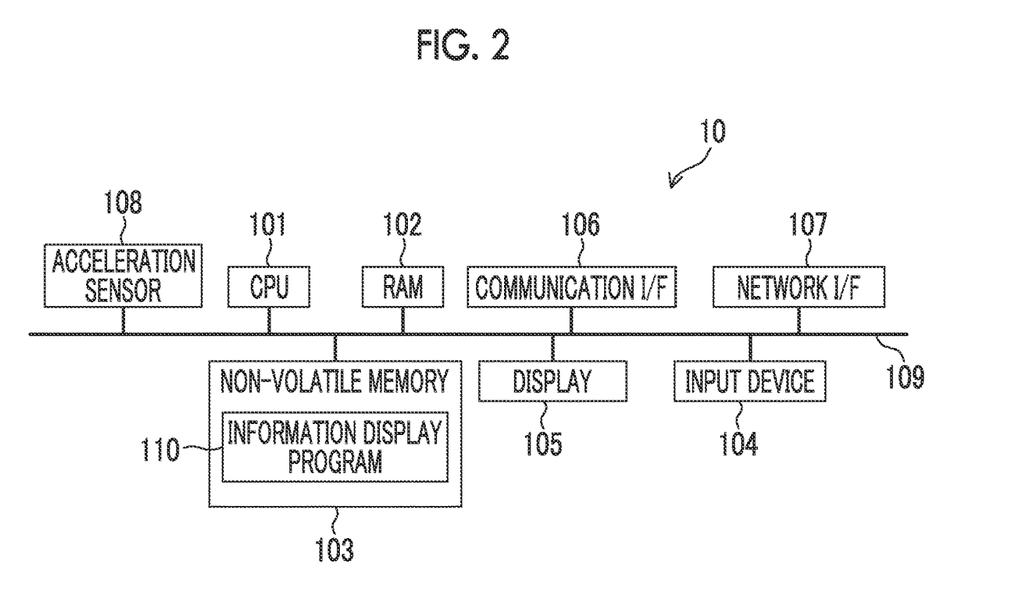
FIG. 2 is a diagram showing an example of a hardware configuration of an information processing apparatus.

FIG. 2 is a diagram showing an example of a hardware configuration of the information processing apparatus 10. The information processing apparatus 10 includes a central processing unit (CPU) 101, a random access memory (RAM) 102, a non-volatile memory 103, an input device 104 including a keyboard, a mouse, a microphone, and the like, a display 105, a communication interface 106, a network interface 107, and an acceleration sensor 108. The hardware is connected to a bus 109.

The display 105 may be a touch panel display. The communication interface 106 is an interface for the information processing apparatus 10 to perform communication with the biological information measurement device 20. A communication method may be any of wired or wireless. For wireless communication, for example, a method compliant with an existing wireless communication standard, such as Wi-Fi (registered trademark) and Bluetooth (registered trademark), can be applied. The network interface 107 is an interface for the information processing apparatus 10 to be connected to the network 40. A communication method may be any of wired or wireless. For wireless communication, for example, a method compliant with an existing wireless communication standard, such as Wi-Fi (registered trademark), can be applied. The acceleration sensor 108 is used to detect an orientation of the display 105.

The non-volatile memory 103 is a storage medium, such as a hard disk and a flash memory, and stores an information display program 110. The RAM 102 is a work memory for the CPU 101 to execute a process. The CPU 101 loads the information display program 110 stored in the non-volatile memory 103 into the RAM 102, and executes the process in accordance with the information display program 110. The CPU 101 is an example of a "processor" according to the disclosed technology.

Figure 3:
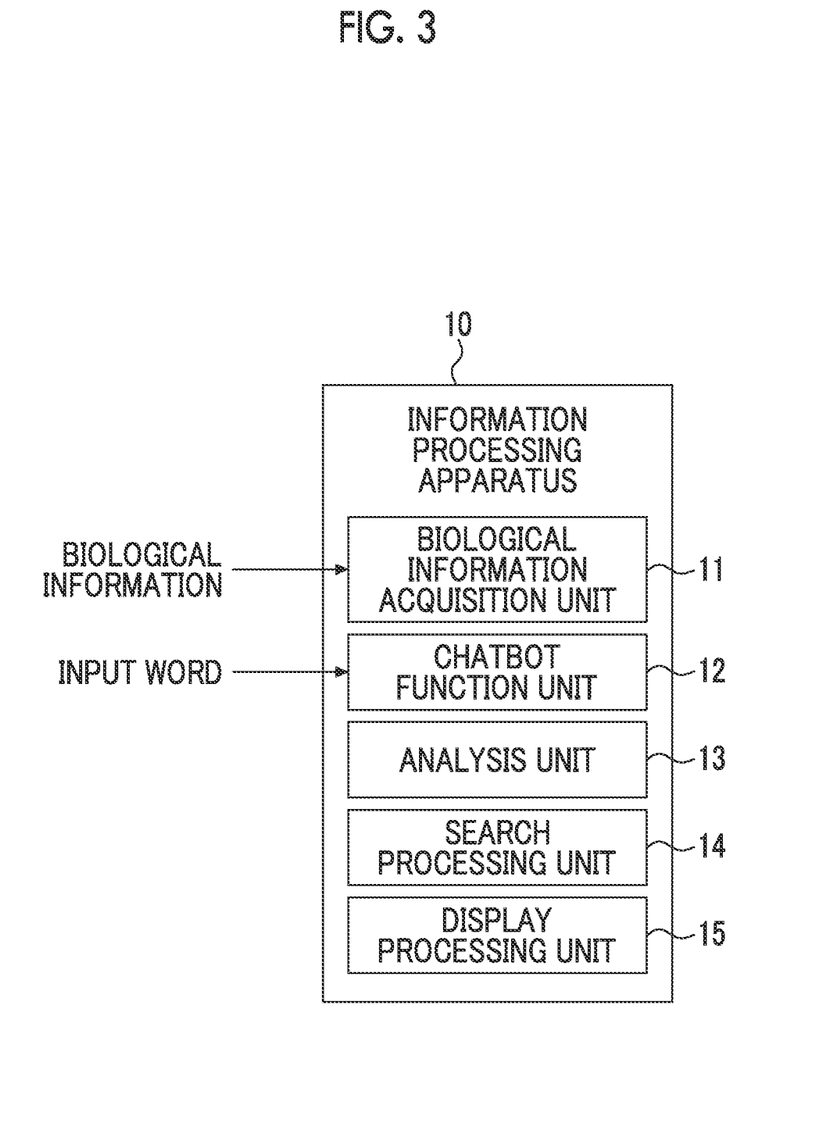
FIG. 3 is a functional block diagram showing an example of a functional configuration of the information processing apparatus according to the embodiment of the disclosed technology.

FIG. 3 is a functional block diagram showing an example of a functional configuration of the information processing apparatus 10. The information processing apparatus 10 includes a biological information acquisition unit 11, a chatbot function unit 12, an analysis unit 13, a search processing unit 14, and a display processing unit 15. By the CPU 101 executing the information display program 110, the CPU 101 functions as the biological information acquisition unit 11, the chatbot function unit 12, the analysis unit 13, the search processing unit 14, and the display processing unit 15.

The biological information acquisition unit 11 acquires the biological information of the user measured by the biological information measurement device 20. The biological information acquisition unit 11 acquires the measurement value of the body temperature, the heartbeat, the electrocardiography, the myoelectricity, the blood pressure, the arterial oxygen saturation (SpO2), the blood glucose level, the lipid level, or the like as the biological information from the biological information measurement device 20 by the communication with the biological information measurement device 20. In a case in which the biological information is intermittently measured by the biological information measurement device 20, the biological information acquisition unit 11 may acquire the biological information each time the measurement is performed by the biological information measurement device 20. In a case in which the biological information is time-series data, such as the electrocardiographic waveform, the biological information acquisition unit 11 may acquire the time-series data over a predetermined period (for example, 1 minute) as the biological information in one measurement. In addition, in a case in which the time-series data, such as the electrocardiographic waveform, is always measured by the biological information measurement device 20, the biological information acquisition unit 11 may always acquire the time-series data.

The chatbot function unit 12 has a function of responding to a text or voice input by the user using the input device 104. The chatbot function unit 12 is constructed by using, for example, known natural language processing technique and machine learning. The user can request the chatbot realized by the chatbot function unit 12 to present the biological information (for example, the measurement value of the body temperature) through the text or the voice. In a case in which the user requests the presentation of the biological information, the chatbot function unit 12 outputs the biological information acquired by the biological information acquisition unit 11 as a response. In addition, the user can also request the chatbot to perform the web search by designating any search keyword. In a case in which the user requests to perform the web search, the chatbot function unit 12 causes the search processing unit 14 to perform the web search based on the designated search keyword and outputs the result as a response.

The analysis unit 13 analyzes the word input by the user (hereinafter, referred to as an input word) in the conversation with the chatbot and the biological information acquired by the biological information acquisition unit 11, and determines whether or not the abnormality occurs in the physical condition of the user based on the input word and the biological information. The analysis unit 13 determines that the abnormality occurs in the physical condition of the user in a case in which, for example, a word, which is registered in advance as a word related to the physical condition, a symptom, health, feeling, emotion, or a disease name of the user, is included in the input word.

For example, in a case in which the word registered in advance, such as "fever", "cough", "headache", "stomach ache", "dizzy", "cold", "I cannot sleep", "anxiety", "I feel depressed", "I feel listless", "I get annoyed", "influenza", "novel coronavirus", or "COVID-19" is included in the input word, the analysis unit 13 may determine that the abnormality occurs in the physical condition of the user.

In addition, in a case in which the measurement value of the body temperature, the heartbeat, the electrocardiography, the myoelectricity, the blood pressure, the arterial oxygen saturation (SpO2), the blood glucose level, the lipid level, or the like as the biological information is not within a predetermined range, the analysis unit 13 may determine that the abnormality occurs in the physical condition of the user. The predetermined range described above may be a predetermined fixed value, or may be a range determined based on the measurement value of the user in a most recent predetermined period. In addition, in a case in which a fluctuation amount of the measurement value as the acquired biological information is larger than a predetermined amount, the analysis unit 13 may determine that the abnormality occurs in the physical condition of the user. The fluctuation amount described above may be, for example, a fluctuation amount from an average of the measurement values of the user in the most recent predetermined period (for example, one week).

In a case in which it is determined that the abnormality occurs in the physical condition of the user based on at least one of the input word or the biological information, the search processing unit 14 performs the web search based on at least one of the input word related to the determination or the biological information. That is, in a case in which it is determined that the abnormality occurs in the physical condition of the user based only on the input word out of the input word and the biological information, the search processing unit 14 performs the web search based on the input word. In addition, in a case in which it is determined that the abnormality occurs in the physical condition of the user based only on the biological information out of the input word and the biological information, the search processing unit 14 performs the web search based on the biological information. In addition, in a case in which it is determined that the abnormality occurs in the physical condition of the user based on each of the input word and the biological information, the search processing unit 14 performs the web search based on both the input word and the biological information.

In a case in which the web search is performed based on the input word, the search processing unit 14 performs the web search by inputting all or a part of the input words as the search keyword to the search engine (not shown). For example, the search processing unit 14 inputs the input word of "I have a headache" input by the user in the conversation with the chatbot to the search engine as the search keyword. It should be noted that the search engine may be present on a website (so-called search site) accessible via the network 40.

In a case in which the search processing unit 14 performs the web search based on the biological information, the search processing unit 14 generates the search keyword based on the biological information and inputs the search keyword to the search engine, thereby performing the web search. That is, the search processing unit 14 generates the text used as the search keyword based on the measurement value of the body temperature, the heartbeat, the electrocardiography, the myoelectricity, the blood pressure, the arterial oxygen saturation (SpO2), the blood glucose level, the lipid level, or the like, as the biological information. For example, the search processing unit 14 may generate a text describing the type of the biological information and the measurement value, such as "body temperature 39 point 2 degrees" as the search keyword, and may generate a text indicating a qualitative symptom specified from various measurement values, such as "high heart rate and rapid increase in blood glucose level" as the search keyword.

In a case in which the search processing unit 14 performs the web search based on both the input word and the biological information, the search processing unit 14 may perform the web search using the search keyword that combines the input word and the text generated based on the biological information. On the other hand, in a case in which the user designates the search keyword and requests the chatbot to perform the web search, the search processing unit 14 performs the web search using the search keyword designated by the user.

Figure 4:
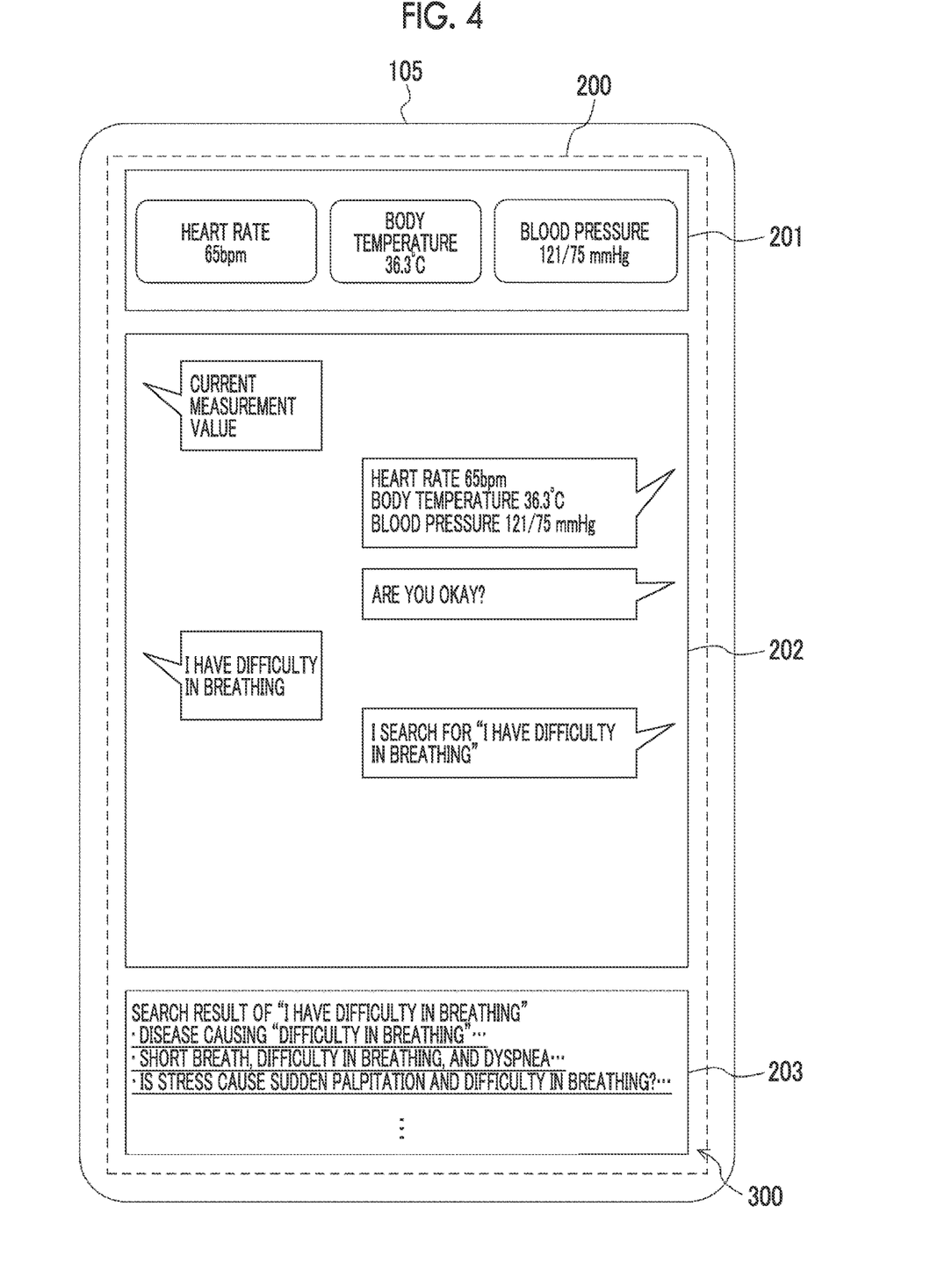
FIG. 4 is a diagram showing an example of a user interface screen according to the embodiment of the disclosed technology.

The display processing unit 15 displays a user interface screen 300 (hereinafter, referred to as the UI screen 300) on a display screen 200 of the display 105. FIG. 4 is a diagram showing an example of the UI screen 300. The UI screen 300 includes a first region 201, a second region 202, and a third region 203.

The display processing unit 15 displays the biological information of the user acquired by the biological information acquisition unit 11 in the first region 201 of the display screen 200 (UI screen 300). FIG. 4 shows a case in which the current measurement values of the heartbeat, the body temperature, the blood pressure as the biological information are displayed in the first region 201.

In addition, the display processing unit 15 displays the text indicating the content of the conversation between the user and the chatbot in the second region 202 together with the biological information displayed in the first region 201.

FIG. 4 shows a case in which the user requests the chatbot to present the biological information by inputting the "current measurement value", and, in response to this, the chatbot presents the current measurement values of the heartbeat, the body temperature, and the blood pressure acquired by the biological information acquisition unit 11. It should be noted that the display processing unit 15 may update the biological information to be displayed in the first region 201 of the display screen 200 in response to the request of the user for presenting the biological information to the chatbot. In addition, the example shown in FIG. 4 shows a case in which the chatbot confirms the physical condition of the user by asking a question to the user, saying, "Are you okay?", and the user answers "I have difficulty in breathing". The analysis unit 13 determines that the abnormality occurs in the physical condition of the user from the input word of "I have difficulty in breathing" input by the user in the conversation with the chatbot. The search processing unit 14 performs the web search by inputting the input word of "I have difficulty in breathing", which is determined that the abnormality occurs in the physical condition of the user, to the search engine as the search keyword.

Figure 5:
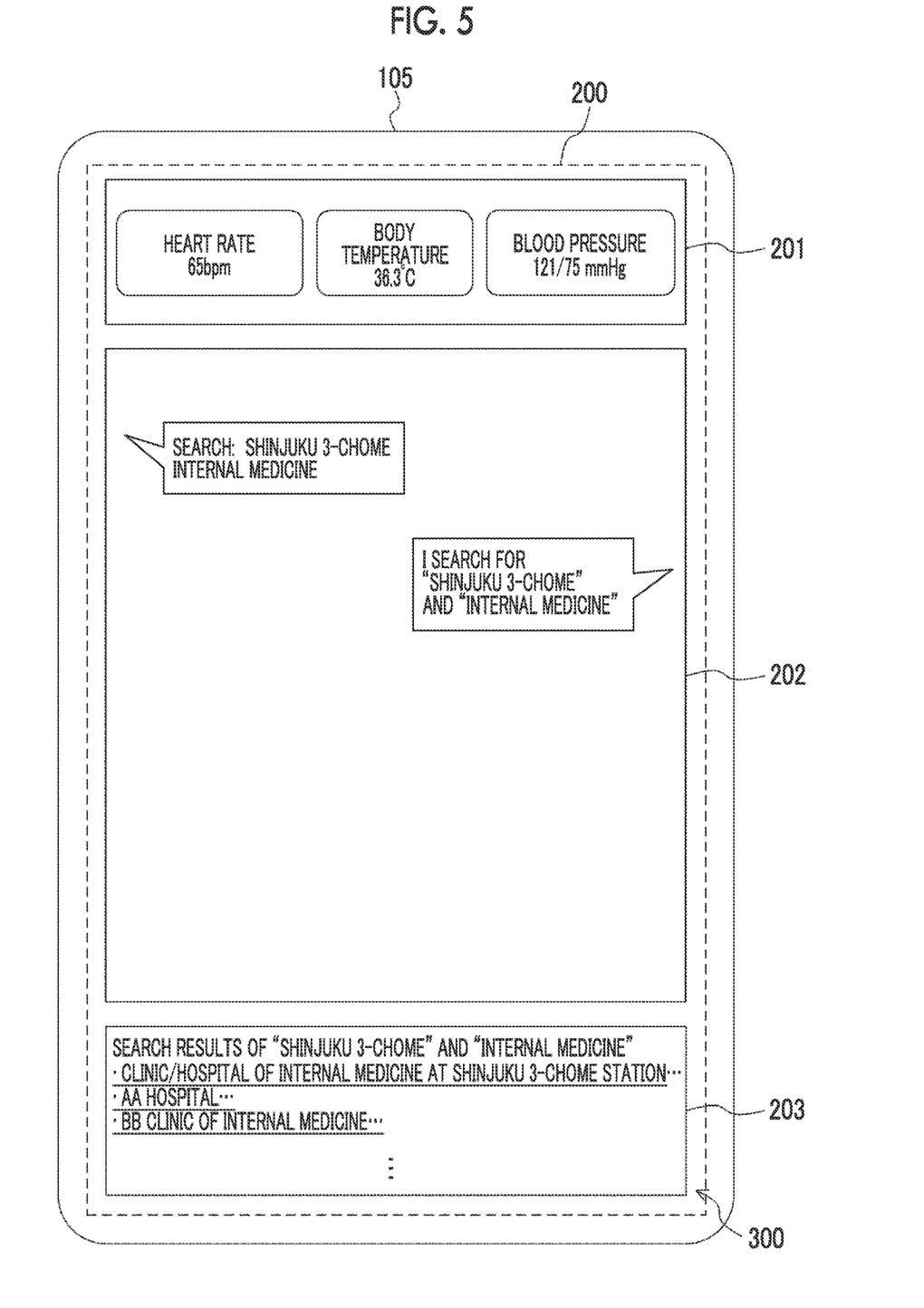
FIG. 5 is a diagram showing another example of the user interface screen according to the embodiment of the disclosed technology.

The display processing unit 15 performs a process of displaying the result of the web search by the search processing unit 14 in the third region 203 together with the biological information displayed in the first region 201 and the text displayed in the second region 202. FIG. 4 shows a case in which a list of links for accessing a website extracted by performing the web search using the input word of "I have difficulty in breathing" as the search keyword is displayed in the third region 203. As shown in FIG. 5, the result of the web search performed in a case in which the user designates the search keyword and requests the chatbot to perform the web search is also displayed in the third region 203. In the example shown in FIG. 4, the orientation of the display screen 200 is a vertically long orientation, and the first to third regions 201 to 203 are disposed to be arranged in order in a vertical direction. The disposition of the first to third regions 201 to 203 can be appropriately changed.

Figure 6:
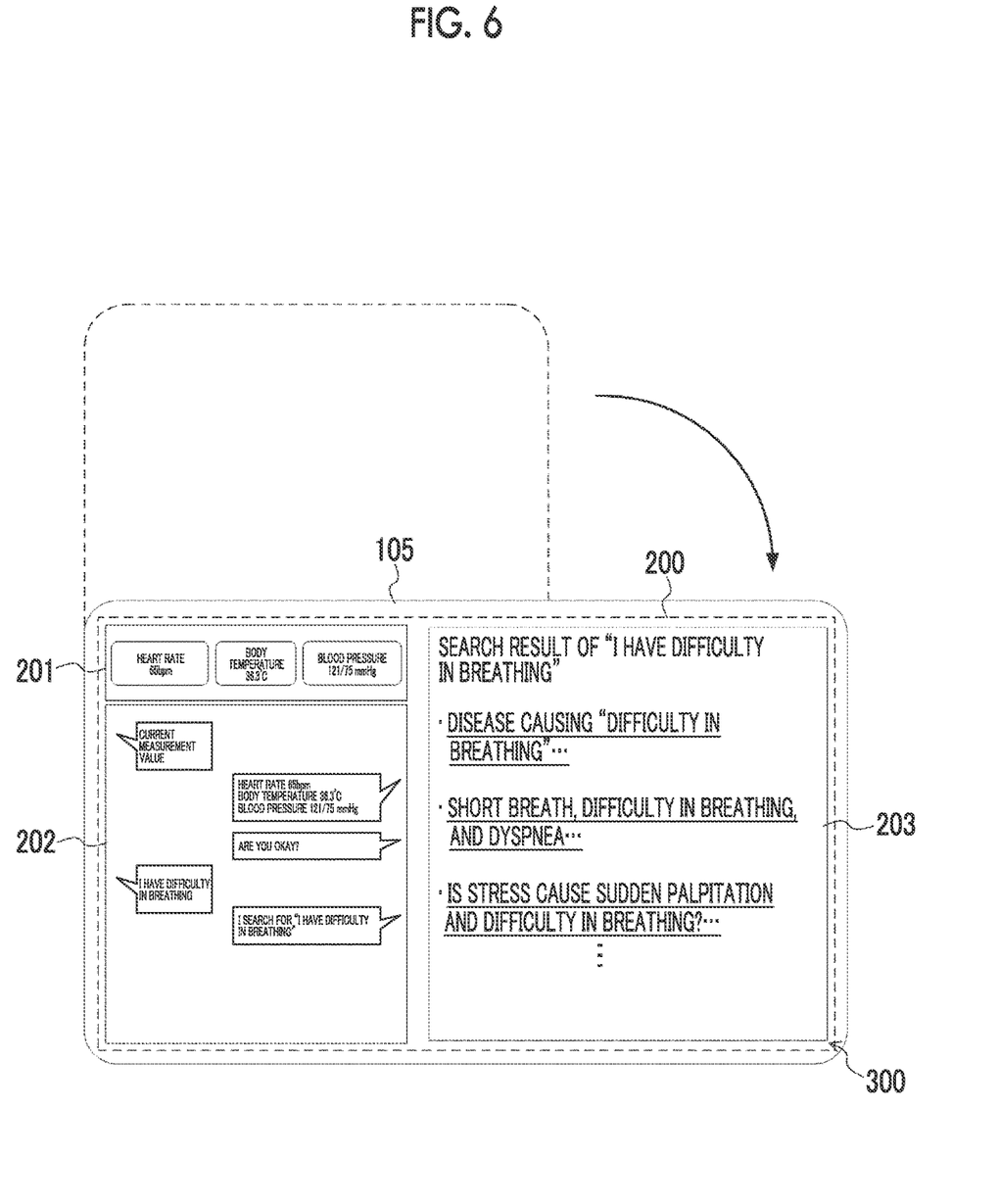
FIG. 6 is a diagram showing still another example of the user interface screen according to the embodiment of the disclosed technology.

The display processing unit 15 changes a disposition and a display area of each of the first to third regions 201 to 203 in accordance with a rotation operation of the display screen 200. For example, as shown in FIG. 6, in a case in which a rotation operation is performed such that the orientation of the display screen 200 is a horizontally long orientation, the acceleration sensor 108 detects a change in the orientation of the display screen 200. In a case in which it is determined that the orientation of the display screen 200 is a horizontally long orientation based on an output signal of the acceleration sensor 108, the display processing unit 15 disposes the first region 201 in which the biological information is displayed and the second region 202 in which the text indicating the content of the conversation with the chatbot is displayed, on a left half region of the display screen 200, and disposes the third region 203 in which the result of the web search is displayed on a right half region of the display screen 200. As a result, the display area of the third region 203 in which the result of the web search is displayed is larger than that in a case in which the display screen 200 is disposed to be a vertically long orientation (see FIG. 4).

Figure 7:
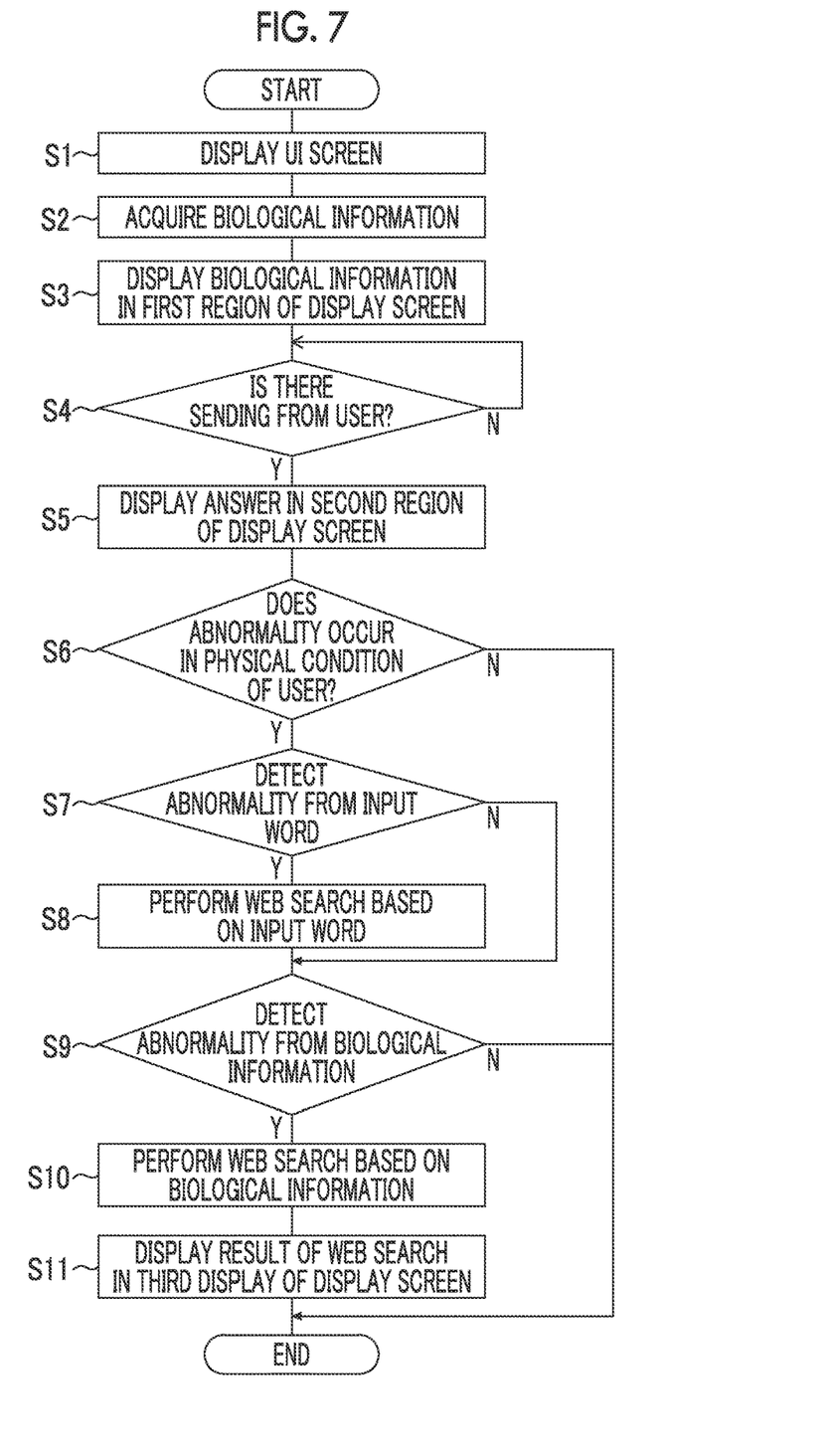
FIG. 7 is a flowchart showing an example of a flow of a process performed by executing an information display program according to the embodiment of the disclosed technology.

FIG. 7 is a flowchart showing an example of a flow of a process performed by the CPU 101 executing the information display program 110. The information display program 110 is executed, for example, in a case in which the user gives an instruction to start the process by operating the input device 104.

In step S1, the CPU 101 functions as the display processing unit 15 and displays the UI screen 300 on the display screen 200 of the display 105. In an initial state, the first to third regions 201 to 203 of the UI screen 300 may be left blank.

In step S2, the CPU 101 functions as the biological information acquisition unit 11 and acquires the biological information from the biological information measurement device 20.

In step S3, the CPU 101 functions as the display processing unit 15 and displays the biological information acquired in step S2 in the first region of the display screen 200.

In step S4, the CPU 101 determines whether or not there is sending from the user to the chatbot. The user sends, for example, a request for presenting his/her biological information, a request for the web search, various other requests, and an inquiry to the chatbot. The sending from the user is acquired as the input word and displayed in the second region 202 of the display screen 200.

In step S5, the CPU 101 functions as the chatbot function unit 12 and outputs the answer to the sending from the user. Thereafter, the CPU 101 functions as the display processing unit 15 and displays the answer output from the chatbot function unit 12 in the second region 202 of the display screen 200.

In step S6, the CPU 101 functions as the analysis unit 13 and determines whether or not the abnormality occurs in the physical condition of the user based on the biological information acquired in step S2 and the input word acquired in step S4. In a case in which it is determined that the abnormality occurs in the physical condition of the user, the process proceeds to step S7, and in a case in which it is determined that the abnormality does not occur in the physical condition of the user, the present routine ends.

In step S7, the CPU 101 determines whether or not the abnormality in the physical condition of the user is detected from the input word. In a case in which it is determined that the abnormality in the physical condition of the user is detected from the input word, the process proceeds to step S8, and in a case in which it is determined that the abnormality in the physical condition of the user is not detected from the input word, the process proceeds to step S9.

In step S8, the CPU 101 functions as the search processing unit 14 and performs the web search using the input word as the search keyword.

In step S9, the CPU 101 determines whether or not the abnormality in the physical condition of the user is detected from the biological information. In a case in which it is determined that the abnormality in the physical condition of the user is detected from the biological information, the process proceeds to step S10, and in a case in which it is determined that the abnormality in the physical condition of the user is not detected from the biological information, the present routine ends.

In step S10, the CPU 101 functions as the search processing unit 14, generates the text based on the biological information, and performs the web search using the generated text as the search keyword.

In step S11, the CPU 101 functions as the display processing unit 15 and displays the result of the web search performed in step S8 and/or step S10 in the third region 203 of the display screen 200.

As described above, the information processing apparatus 10 according to the embodiment of the disclosed technology performs the process of displaying the biological information of the user in the first region 201 of the display screen 200, displaying the text indicating the content of the conversation between the user and the chatbot in the second region 202 of the display screen 200 together with the biological information displayed in the first region 201, and displaying the result of the web search in the third region 203 of the display screen 200 together with the biological information displayed in the first region 201 and the text displayed in the second region 202.

In this way, the biological information, the content of the conversation with the chatbot, and the result of the web search are simultaneously displayed on the display screen 200, which can improve the convenience of the user in providing useful information for the health management of the user.

In addition, in a case in which it is determined that the abnormality occurs in the physical condition of the user from at least one of the word (input word) input by the user in the conversation with the chatbot or the biological information acquired from the biological information measurement device 20, the information processing apparatus 10 performs the process of performing the web search based on at least one of the input word related to the determination or the biological information, and displaying the result of the web search in the third region 203 of the display screen 200. As described above, with the information processing apparatus 10, in a case in which there is a possibility that the abnormality occurs in the physical condition of the user, the web search for useful information for the health management of the user is performed, so that it is possible to reduce the burden on the web search by the user.

Figure 8:
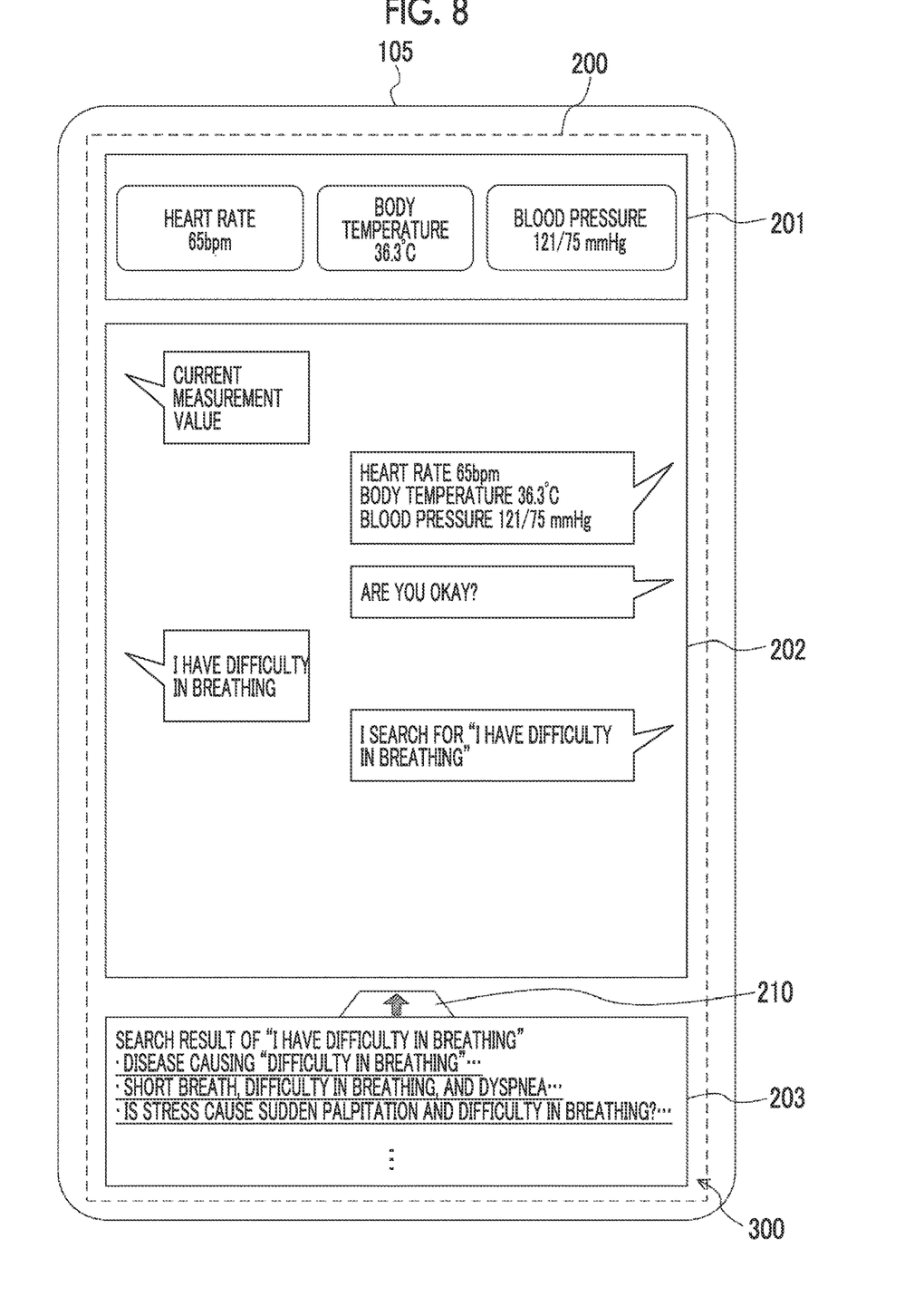
FIG. 8 is a diagram showing still another example of the user interface screen according to the embodiment of the disclosed technology.
Figure 9:
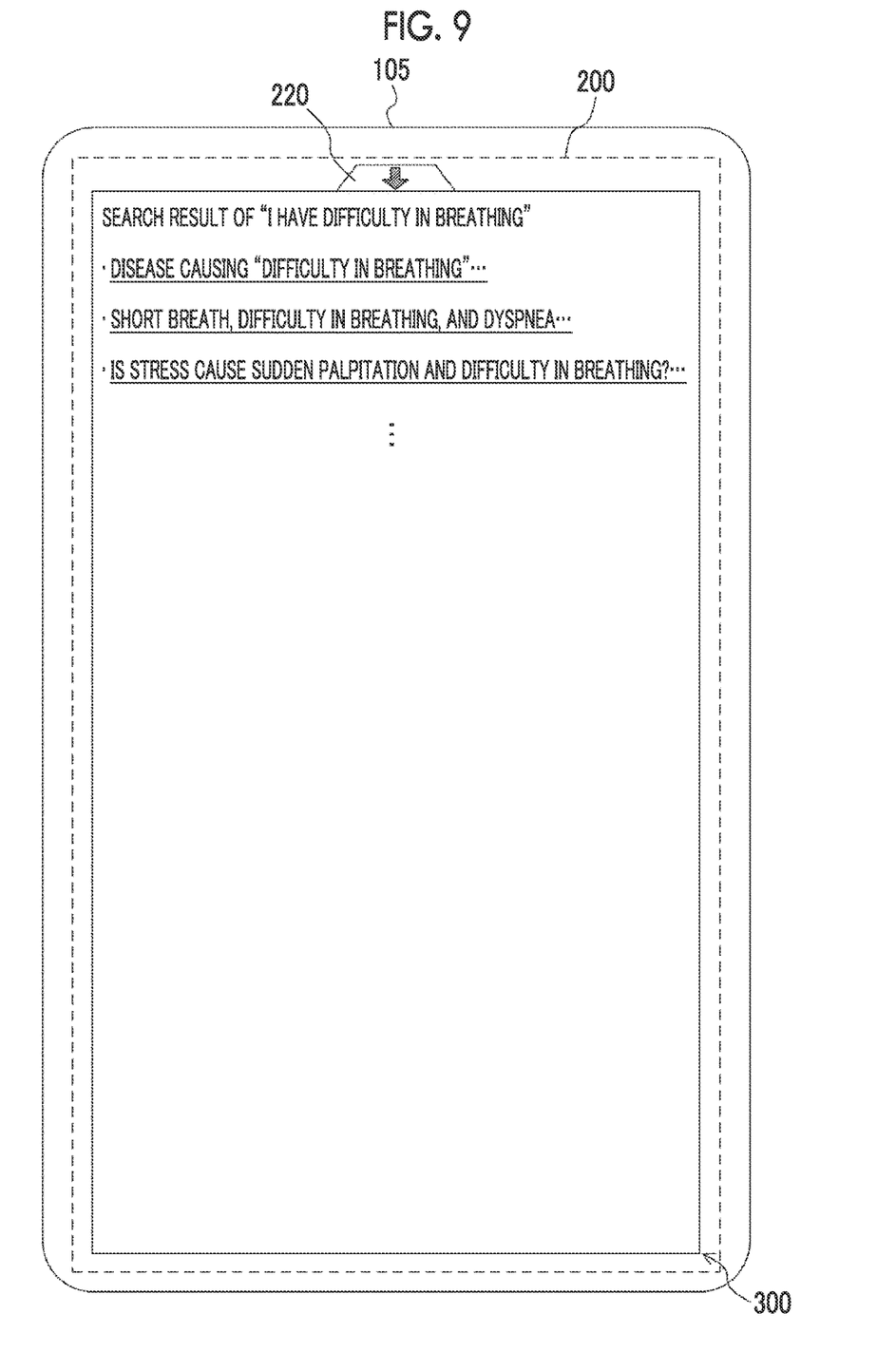
FIG. 9 is a diagram showing still another example of the user interface screen according to the embodiment of the disclosed technology.

It should be noted that a form of the UI screen 300 can be modified in various ways. For example, as shown in FIG. 8, an expanded-display button 210 is assigned in the third region 203, and in a case in which an input operation for touching the expanded-display button 210 is performed, the display processing unit 15 may perform a process of displaying the search result displayed in the third region 203 on the entire display screen, as shown in FIG. 9. A reduced-display button 220 is assigned in the expanded third region 203, and in a case in which an input operation for touching the reduced-display button 220 is performed, the display processing unit 15 returns the display of the UI screen 300 to the state shown in FIG. 8.

Figure 10:
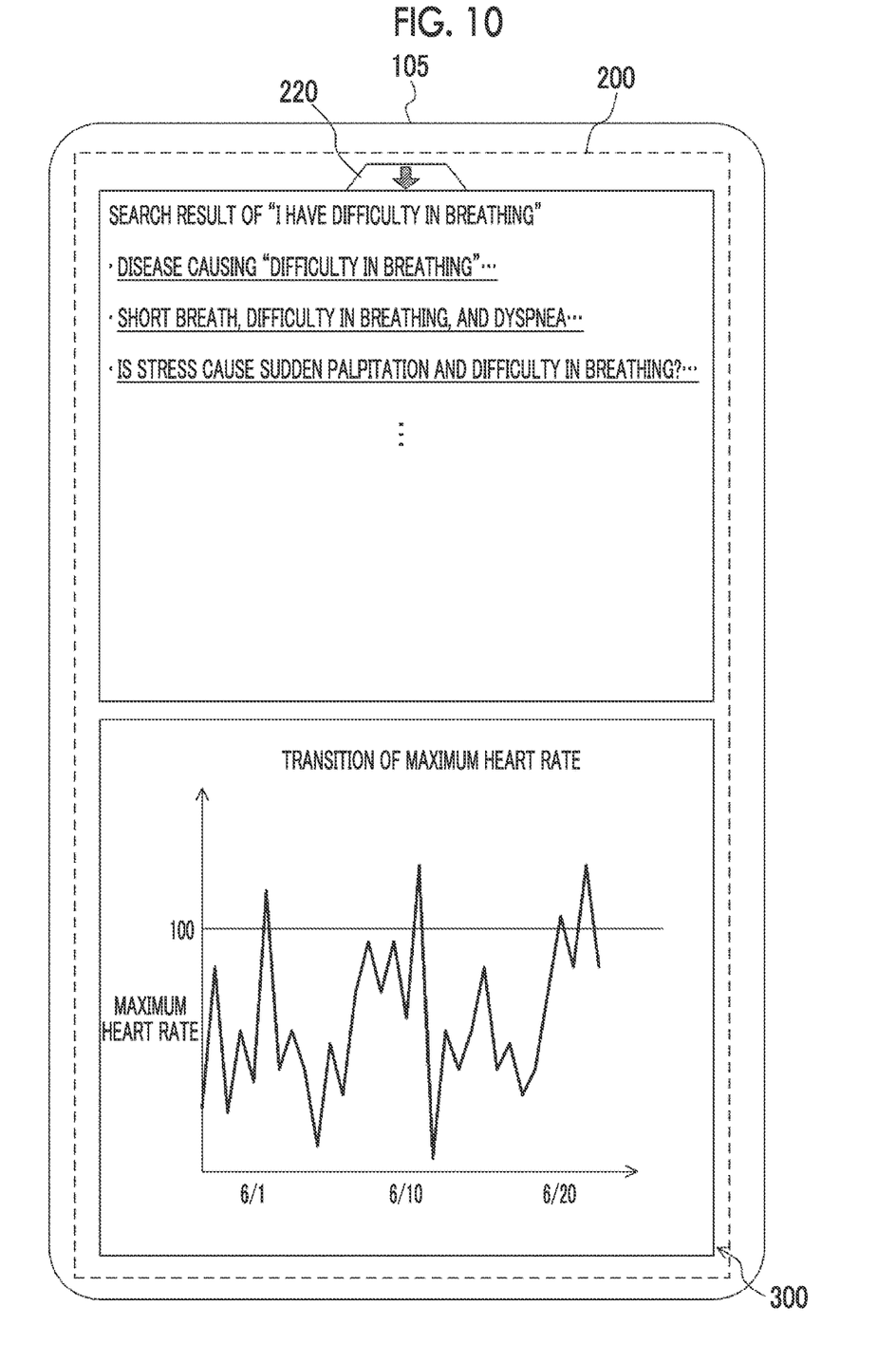
FIG. 10 is a diagram showing still another example of the user interface screen according to the embodiment of the disclosed technology.

In addition, in a case in which the input operation of touching the expanded-display button 210 is performed, the display processing unit 15 may perform a process of displaying the result of the web search displayed in the third region 203 together with a history of the biological information, as shown in FIG. 10. FIG. 10 shows a case in which a graph showing a transition of the maximum heart rate as the history of the biological information is displayed together with the result of the web search. It should be noted that the display of the history of the biological information is not limited to the graph, but the history may be displayed by a list of texts.

Figure 11:
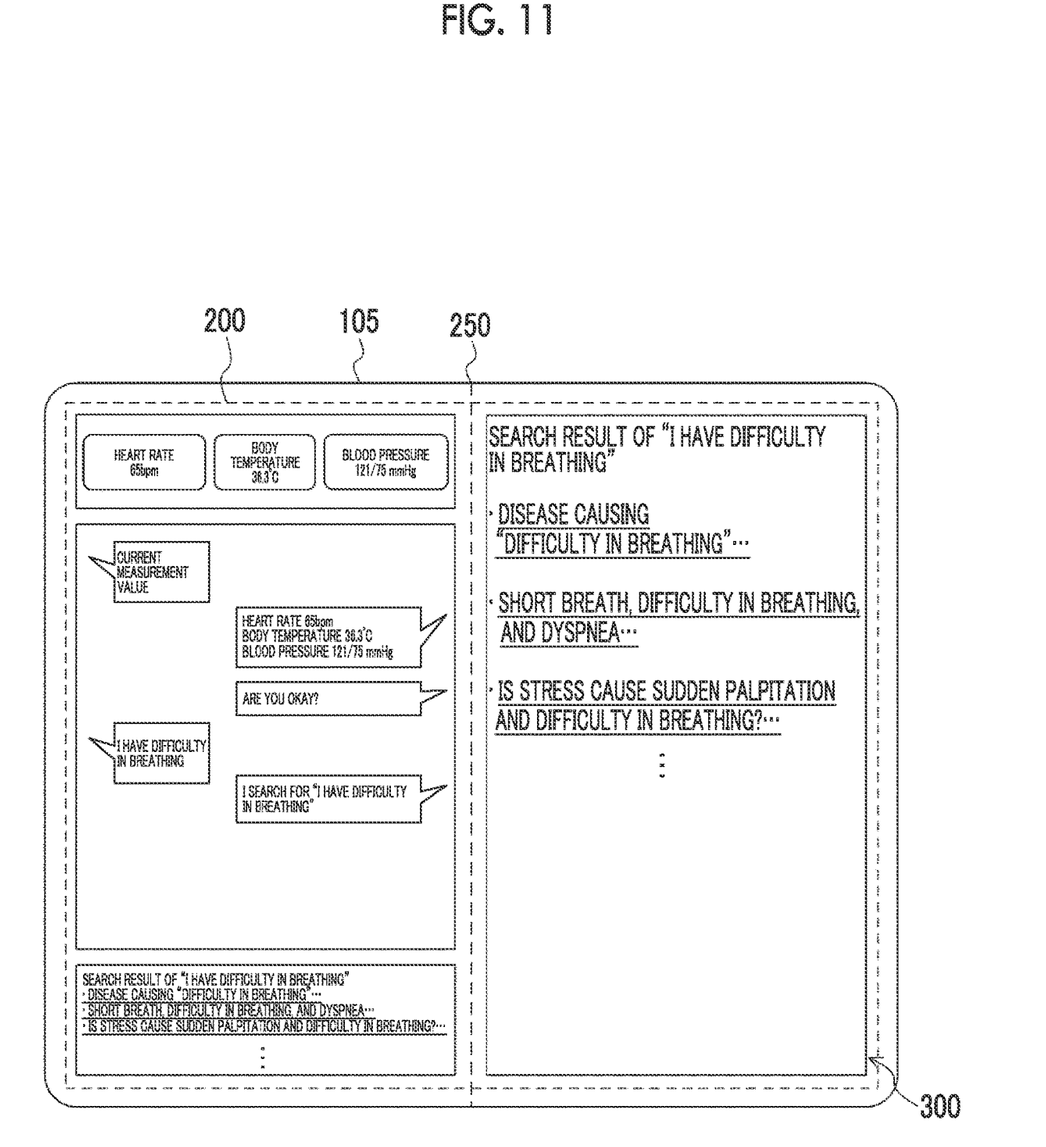
FIG. 11 is a diagram showing still another example of the user interface screen according to the embodiment of the disclosed technology.

In addition, as shown in FIG. 11, in a case in which the display 105 is a so-called foldable display and the display screen 200 is expandable, the display processing unit 15 may display the result of the web search in an expanded region of the display screen 200. FIG. 11 shows the display 105 that can be folded along a folding line 250. In this example, by opening the display 105 along the folding line 250, the display screen 200 is expanded, and the result of the web search is displayed in a region on a right side of the expanded figure of the display screen 200.

In the embodiment described above, as a hardware structure of processing units that execute various processes, such as the biological information acquisition unit 11, the chatbot function unit 12, the analysis unit 13, the search processing unit 14, and the display processing unit 15, the following various processors can be used. The various processors include, for example, a programmable logic device (PLD), such as an FPGA, which is a processor of which a circuit configuration can be changed after manufacture, and a dedicated electrical circuit, such as an application specific integrated circuit (ASIC), which is a processor having a dedicated circuit configuration designed to execute a specific process, in addition to the CPU and the GPU which are general-purpose processors that execute software (program) to function as various processing units as described above.

One processing unit may be composed of one of the various processors or may be composed of a combination of two or more processors of the same type or different types (for example, a combination of a plurality of FPGAs or a combination of a CPU and an FPGA). In addition, a plurality of processing units may be composed of one processor.

A first example of the configuration in which the plurality of processing units are composed of one processor is a form in which one processor is composed of a combination of one or more CPUs and software and the processor functions as the plurality of processing units, as represented by the computer, such as a client and a server. A second example thereof is a form in which a processor that realizes all of the functions of a system including the plurality of processing units with one integrated circuit (IC) chip is used, as represented by a system on chip (SoC). In this way, various processing units are composed of one or more of the various processors as the hardware structure.

Further, more specifically, an electric circuit (circuitry) obtained by combining circuit elements, such as semiconductor elements, can be used as the hardware structure of the various processors.

In addition, in the embodiment described above, the aspect has been described in which the information display program 110 is stored (installed) in advance in the non-volatile memory 103, but the disclosed technology is not limited to this. The information display program 110 may be recorded on a recording medium, such as a compact disc read only memory (CD-ROM), a digital versatile disc read only memory (DVD-ROM), or a universal serial bus (USB) memory, and then provided. In addition, the information display program 110 may be downloaded from an external device via a network.

What is claimed is:
1. An information processing apparatus comprising:
at least one processor,
wherein the processor is configured to: perform a process of
displaying a conversation between a user and a chatbot in a second region of the display screen, wherein the conversation is configured to accept user text input for the conversation, and
displaying a biological information of the user in a first region of a display screen separate from the conversation, wherein the biological information is updated via the current measurements taken from a device that continuously measures biological information of the user, and
displaying a result of a web search separate from the conversation and in a third region of the display screen together with the biological information displayed in the first region and the conversation displayed in the second region,
wherein the first, second, and third regions do not overlap one another and the first, second, and third regions are partitioned as areas that are mutually independent; wherein the biological information displayed in the first region, the conversation displayed in the second region, and the result displayed in the third region are all displayed simultaneously on the display screen;
wherein the processor is further configured to:
in response to detecting that an abnormality occurs in a physical condition of the user based on the biological information, that has been measured with a biological information measure continuously or for each predetermined time period and has been received from the biological information measure, automatically generating a search keyword based on the received biological information, and
displaying a result of performing the web search by using the search keyword in the third region.

2. The information processing apparatus according to claim 1,
wherein the processor performs a process of displaying a result of performing the web search based on a word input by the user in the conversation with the chatbot in the third region.

3. The information processing apparatus according to claim 1,
wherein the processor displays a result of performing the web search based on the biological information in the third region.

4. The information processing apparatus according to claim 1,
wherein the processor changes a disposition and a display area of each of the first to third regions in accordance with a rotation operation of the display screen.

5. The information processing apparatus according to claim 1,
wherein the processor performs a process of displaying the result of the web search displayed in the third region on an entire display screen based on an input operation.

6. The information processing apparatus according to claim 1,
herein the processor displays the result of the web search displayed in the third region together with a history of the biological information based on an input operation.

7. The information processing apparatus according to claim 1,
wherein the display screen is expandable, and
in a case in which the display screen is expanded, the processor displays the result of the web search in an expanded region of the display screen.

8. An information processing method executed by at least one processor provided in an information processing apparatus, the method comprising:
displaying a conversation between a user and a chat bot in a second region of the display screen, wherein the conversation is configured to accept user text input for the conversation; and
displaying a biological information of the user in a first region of a display screen separate from the conversation, wherein the biological information is updated via the current measurements taken from a device that continuously measures biological information of the user, and
displaying a result of a web search separate from the conversation and in a third region of the display screen together with the biological information displayed in the first region and the conversation displayed in the second region;
wherein the first, second, and third regions do not overlap one another and the first, second, and third regions are partitioned as areas that are mutually independent; wherein the biological information displayed in the first region, the conversation displayed in the second region, and the result displayed in the third region are all displayed simultaneously on the display screen;
in response to detecting that an abnormality occurs in a physical condition of the user based on the biological information, that has been measured with a biological information measure continuously or for each predetermined time period and has been received from the biological information measure, automatically generating a search keyword based on the received biological information, and
displaying a result of performing the web search by using the search keyword in the third region.

9. A non-transitory computer-readable storage medium storing an information processing program causing at least one processor provided in an information processing apparatus to execute a process comprising:
displaying a conversation between a user and a chat bot in a second region of the display screen, wherein the conversation is configured to accept user text input for the conversation; and
displaying a biological information of the user in a first region of a display screen separate from the conversation, wherein the biological information is updated via the current measurements taken from a device that continuously measures biological information of the user, and
displaying a result of a web search separate from the conversation and in a third region of the display screen together with the biological information displayed in the first region and the conversation displayed in the second region;
wherein the first, second, and third regions do not overlap one another and the first, second, and third regions are partitioned as areas that are mutually independent; wherein the biological information displayed in the first region, the conversation displayed in the second region, and the result displayed in the third region are all displayed simultaneously on the display screen;
in response to detecting that an abnormality occurs in a physical condition of the user based on the biological information, that has been measured with a biological information measure continuously or for each predetermined time period and has been received from the biological information measure, automatically generating a search keyword based on the received biological information, and
displaying a result of performing the web search by using the search keyword in the third region.

* * * * *